Dec. 5, 1967  E. J. GERDES ETAL  3,355,962
ADJUSTABLE STEERING COLUMN MECHANISM
Filed Dec. 10, 1965  4 Sheets-Sheet 1
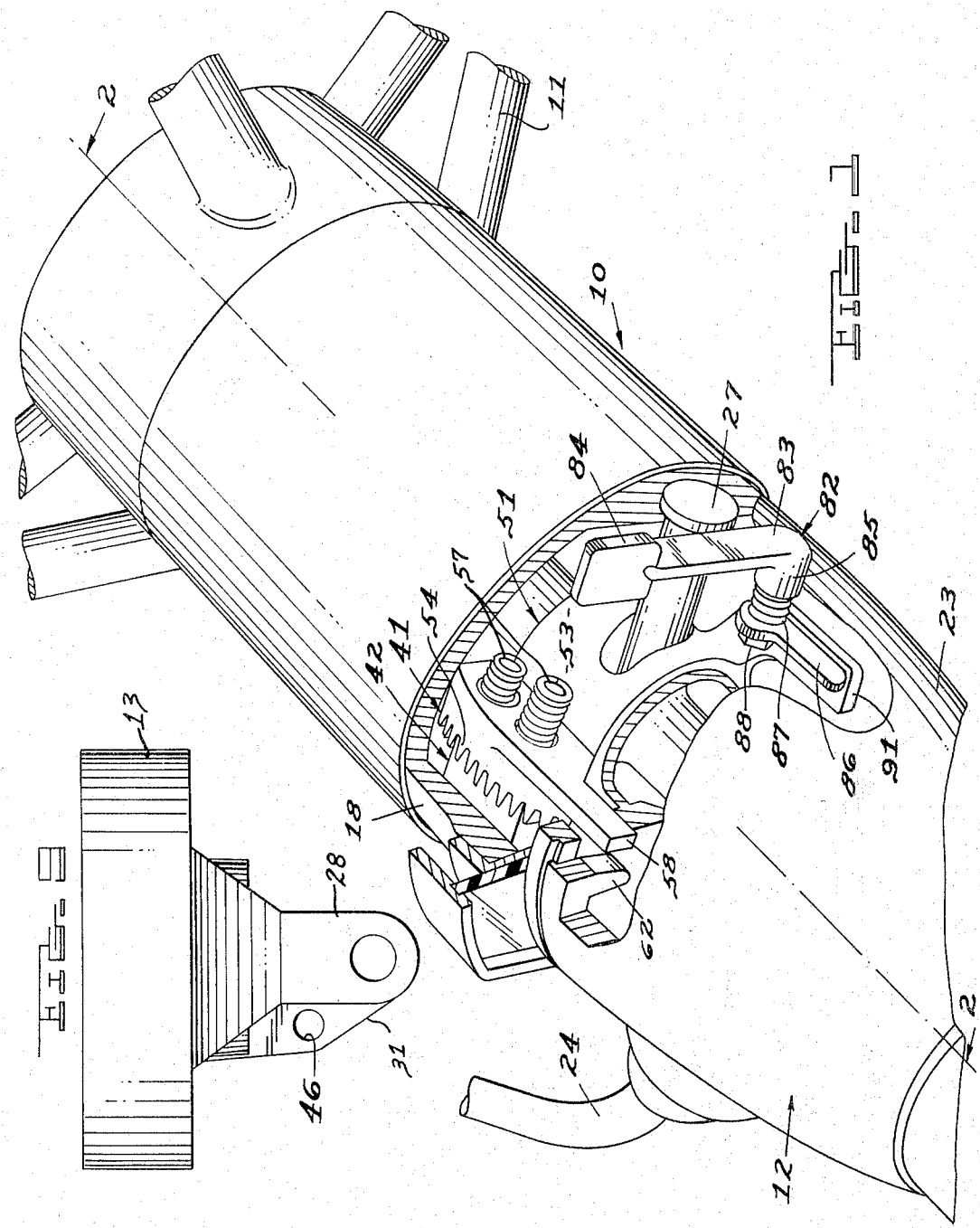
INVENTORS
DALE E. WOOLLEY
EDGAR J. GERDES
BY
John R. Faulkner
Keith L. Zerschling
ATTORNEYS

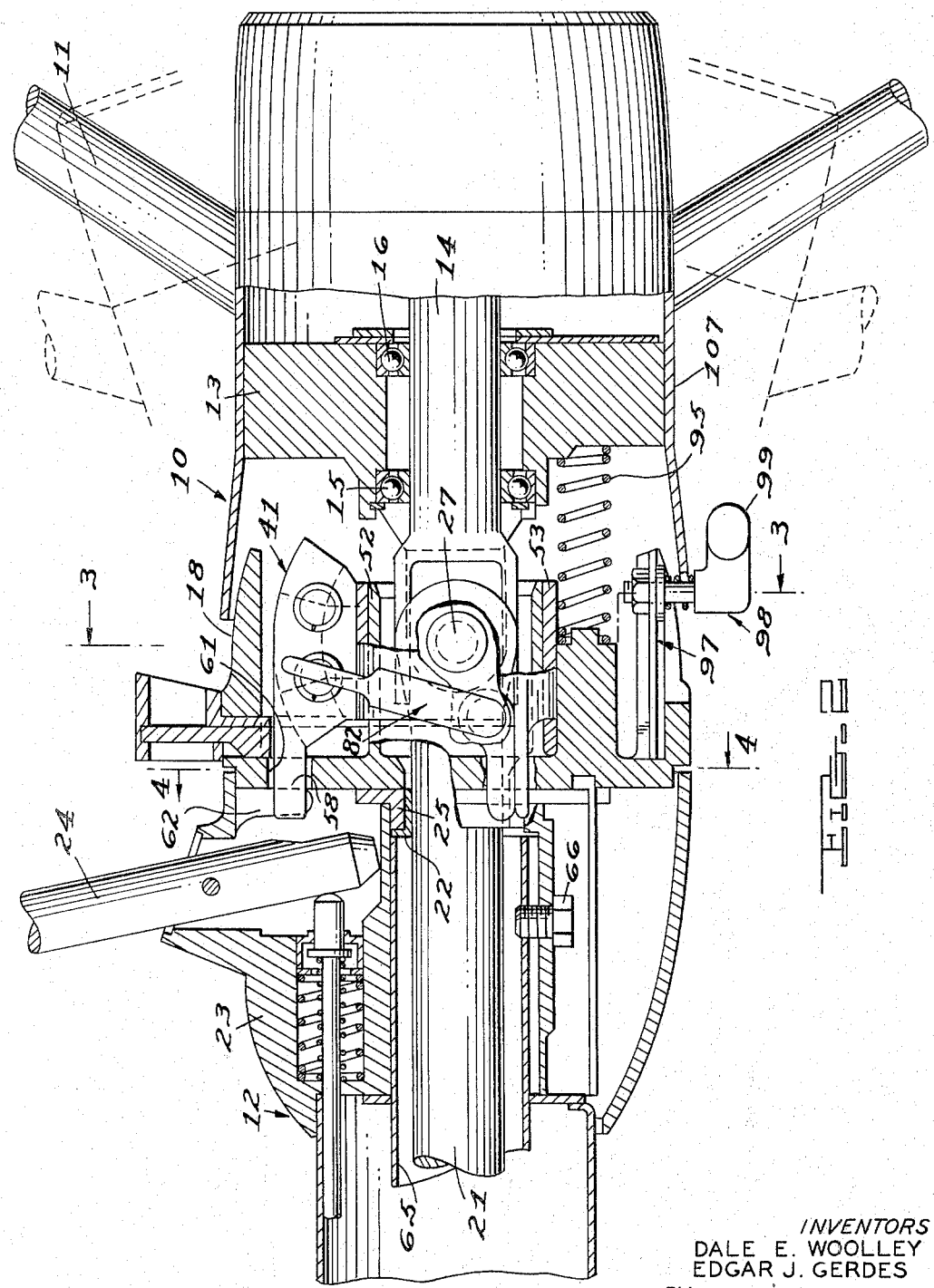

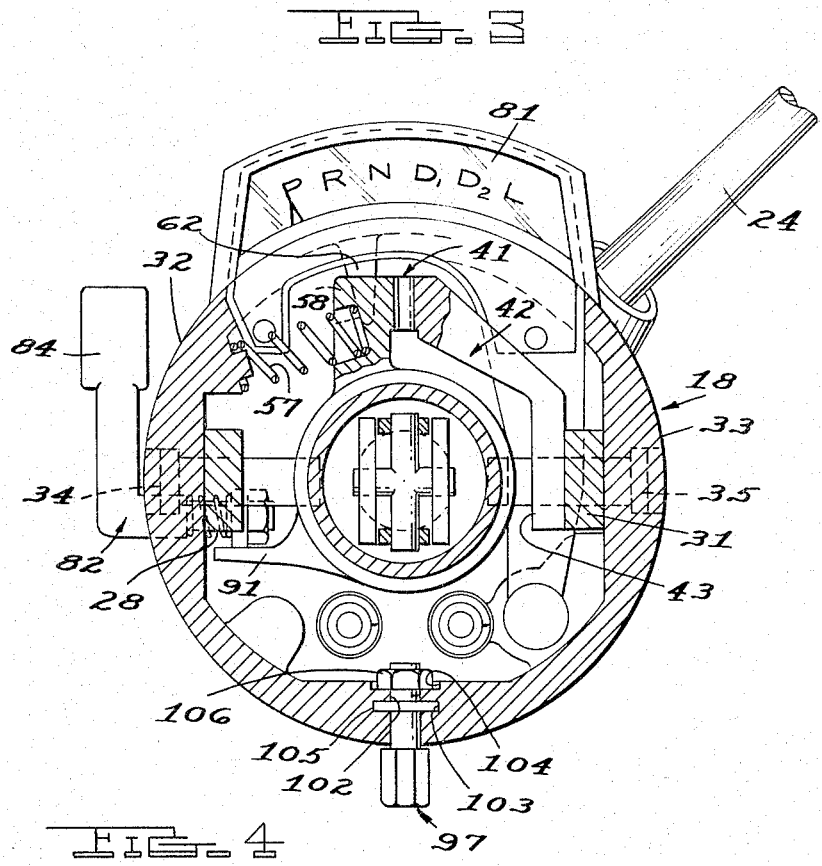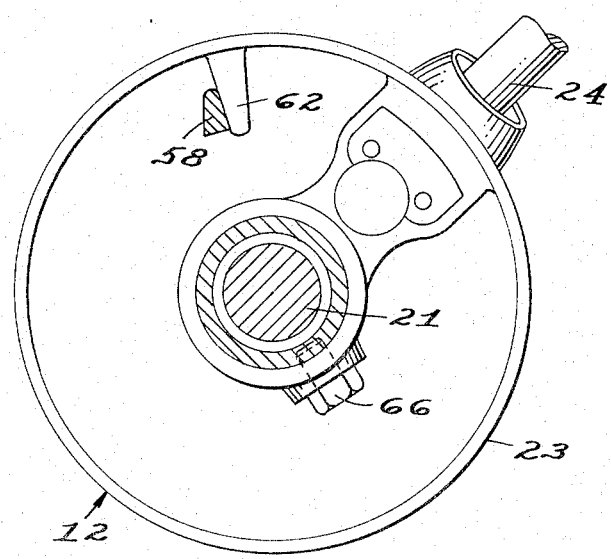

Dec. 5, 1967  E. J. GERDES ET AL  3,355,962
ADJUSTABLE STEERING COLUMN MECHANISM
Filed Dec. 10, 1965  4 Sheets-Sheet 4
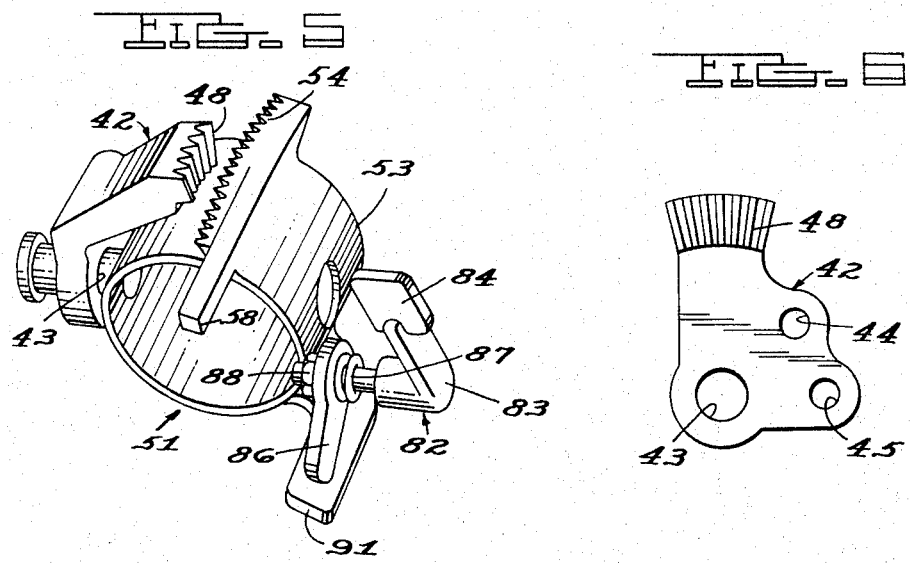
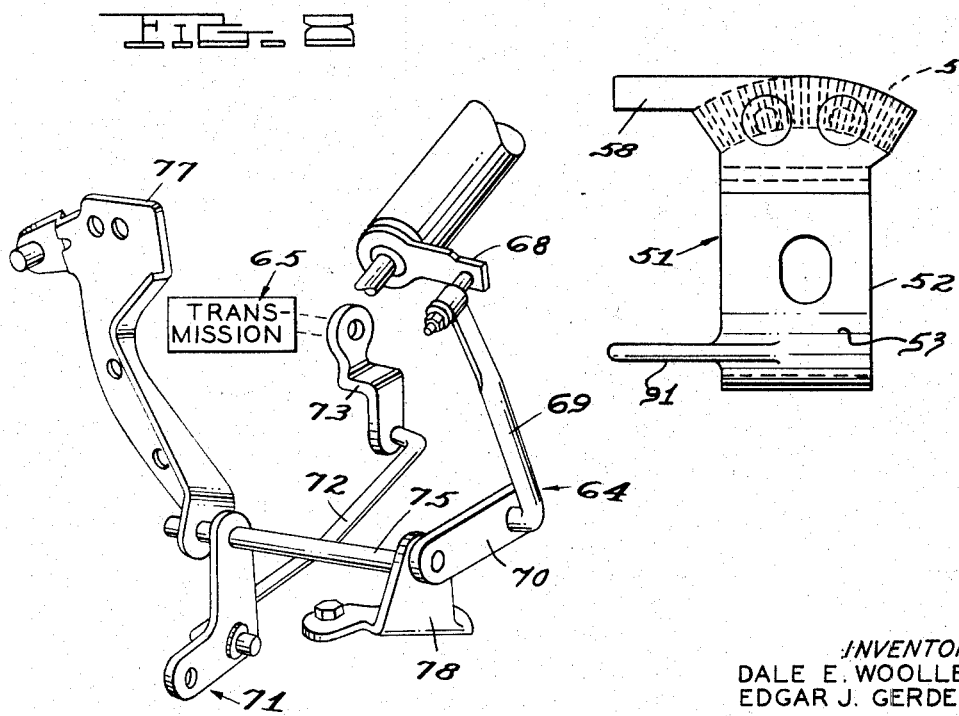
INVENTORS
DALE E. WOOLLEY
EDGAR J. GERDES
BY John R. Faulkner
Keith L. Zerschling
ATTORNEYS 3,355,962
ADJUSTABLE STEERING COLUMN MECHANISM
Edgar J. Gerdes and Dale E. Woolley, Dearborn, Mich., assignors to Ford Motor Company, Dearborn, Mich., a corporation of Delaware
Filed Dec. 10, 1965, Ser. No. 512,988
10 Claims. (Cl. 74—493)

This invention relates to a steering column mechanism for an automotive vehicle, and more particularly, to an adjustable steering column mechanism in which the steering wheel and an upper steering column section may be adjustably positioned into a plurality of different operable driving positions by means of a releasable latching means that may be released through the action of the transmission selector lever.

In the invention, the steering column comprises a fixed lower column section and a movable upper column section including the steering wheel that is pivotally mounted on the lower column section, preferably about a substantially holizontal axis that is disposed transversely with respect to the lower steering column section. A multiple position releasable latch mechanism releasably latches the upper steering column section to the lower steering column section. The releasable latch mechanism includes latch means that is released when the transmission selector housing and lever are moved to a selected position, preferably beyond the conventional park position found in automotive vehicles having an automatic transmission.

Spring means are preferably employed to couple the lower steering column section and the upper steering column section to automatically move or urge the upper steering column section and the steering wheel into an uppermost remote position when the releasable latch means is released through the action of the transmission selector housing and lever. This permits easy egress from and access to the vehicle driver's seat. In addition, the transmission selector housing and transmission selector lever may be used in the above described manner to position the upper steering column section and the steering wheel in any one of a number of different operable driving positions.

Additionally, a second actuating lever or means for releasing the releasable latching mechanism may be employed for permitting the positioning of the upper steering column section and the steering wheel in any one of a number of operable driving positions irrespective of the position of the transmission selector housing and lever. Moreover, a memory device may be employed to locate the upper steering column section and the steering wheel in a previously selected driving position when the steering wheel and upper steering column section are returned toward the operable driving positions from the uppermost remote position.

The releasable latching means preferably takes the form of a sector gear affixed to one of the sections and another sector gear rotatably mounted on the other section for movement about the axis of one of said sections and the steering shaft section mounted therein. The pitch circles of these two gear sectors may lie in a substantially vertical plane that passes through the steering column section in a location that is preferably near the center of these sections.

The present invention thus has the advantage over conventional or known adjustable steering column mechanisms in permitting the release of a releasable latch mechanism by operation of a transmission selector lever and housing, preferably by movement of these components into a position beyond the conventional park position found in automobiles using an automatic transmission. Thus, the vehicle operator, in positioning the steering wheel and upper steering column section of the present invention into a remote position to facilitate easy egress from and access to the driver's seat of the vehicle, need perform only the additional manipulation of moving the transmission selector housing and lever a few degrees beyond the park position. This manipulation is a continuation of the normal movement of the transmission selector housing and lever when it is positioned in the park position as is ordinarily done by the vehicle driver when he leaves the vehicle.

The invention also provides the additional features of a second hand-operated means for permitting adjustment of the upper steering column section and steering wheel into any one of a plurality of different driving positions irrespective of the position of the transmission selector housing and lever. Additional, it provides a memory means which will automatically locate the upper steering column section and steering wheel into a previously selected driving position after it has been moved to the remote uppermost position to facilitate easy egress from and access to the vehicle driver's seat.

An object of the present invention is the provision of an adjustable steering column for an automotive vehicle in which a transmission selector lever may be employed for positioning the upper steering column section and steering wheel in a remote position to facilitate easy egress from and access to the vehicle driver's seat.

A further object of the invention is the provision of an adjustable steering column mechanism for an automotive vehicle in which a transmission selector lever may be employed for adjusting the steering wheel into any one of a number of different operable driving positions.

A further object of the invention is the provision of an adjustable steering column mechanism for an automotive vehicle in which a transmission selector lever may be employed to position the upper steering shaft section and steering wheel in a remote position to facilitate easy egress from and access to the driver's seat of the vehicle and to position the upper steering column section and steering wheel in any one of a number of different operable driving positions, and in which a second hand-operated means may be employed to position the upper steering column section and steering wheel in one of the operable driving positions.

Still another object of the invention is the provision of an adjustable steering column mechanism in which a transmission selector lever may be employed to position the steering wheel in a remote position to facilitate easy egress from and access to the driver's seat of the vehicle, in which both the transmission selector lever and the second hand-operated means may be employed to position the steering wheel in any one of a number of different operable driving positions, and in which a memory device may be employed to locate the steering wheel in a previously selected operable driving position when it is returned from the remote position.

Other objects and attendant advantages of the present invention may be more readily realized as the specification is considered in connection with the attached drawings, in which:

FIGURE 1 is a perspective view, partially cut away, of the adjustable steering column mechanism of the present invention;

FIGURE 2 is a sectional view of the steering column mechanism of the present invention, partially in elevation, taken on the line 2—2 of FIGURE 1;

FIGURE 3 is a sectional view, partially in elevation, taken along the line 3—3 of FIGURE 2;

FIGURE 4 is a partial sectional view taken along the line 4—4 of FIGURE 2;

FIGURE 5 is a partial perspective view of the releasable latching mechanism of the present invention;

FIGURE 6 is a side elevational view of one of the latch members of the releasable latch mechanism shown in FIGURE 5;

FIGURE 7 is an elevational view of the other member of the releasable latch means shown in FIGURE 5;

FIGURE 8 is a perspective view of a linkage mechanism for selecting different drive or operating conditions of a transmission; and FIGURE 9 is an elevational view of the upper housing of the upper steering column section.

Referring now to the drawings in which like reference numerals designate like parts throughout the several views thereof, there is shown in FIGURES 1 through 3, the adjustable steering column mechanism of the present invention in which numeral 10 designates an upper movable steering column section including a steering wheel 11, and in which the numeral 12 designates a fixed lower steering column section 12. The upper steering column section 10 includes a housing 13 that rotatably supports an upper steering shaft section 14 by means of bearings 15 and 16. The steering wheel 11 is connected to the upper steering shaft section 14 by any suitable means, not shown.

The lower steering column section 12 includes a lower fixed housing 18 that rotatably supports a lower steering shaft section 21 by means of bearings, one of which is shown at 22. A transmission selector housing 23, including a transmission selector lever 24 pivotally mounted in the housing 23 by means of pin 25, is rotatably supported on the lower housing 18 and on the lower steering shaft section 21 by the bearing 22 and by engagement with a depending flange 26 on the lower housing 18.

The upper steering shaft section 14 and the lower steering shaft section 21 are coupled by means of a universal joint 27 which will permit the transfer of rotary motion from the steering wheel 11 to the lower steering shaft section 21 through the upper steering shaft section 14 irrespective of the angular position of the upper steering shaft section 14 with respect to the lower steering shaft section 21. The lower steering shaft section 21 is adapted to be coupled to the steering gear (not shown) of an automative vehicle by any conventional means (not shown).

The upper housing 13 of the upper steering shaft section 10 has a pair of spaced arms 28 and 31, that can best be seen by reference to FIGURES 1 through 3, and 9, that are positioned in engagement with portions 32 and 33 of the lower housing 18. A pair of pivot pins 34 and 35 are positioned within the portions 32 and 33 of the lower housing 18 and extend through the arms 28 and 31 of the upper housing 13 to pivotally mount the upper housing 13 and the upper steering column section 10 on the lower housing 18 and the lower steering column section 12. These pins 34 and 35 define a pivotal axis that extends through the center of the universal joint 27 and that is preferably positioned in a substantially horizontal position and substantially transversely with respect to the axis of the upper steering shaft section 14 and the lower steering shaft section 21. This pivotal connection formed by the pins 34 and 35 permits a vehicle operator to adjust the upper steering shaft section 10, including the steering wheel 11, the upper steering shaft section 14 and the upper housing 13, about this pivotal axis into any desired driving position.

A releasable multiple position latch or locking mechanism, generally designated by the numeral 41, is employed to releasably latch or lock the upper steering column section 10, including the steering wheel 11, in any one of a number of different operable driving positions. This multiple position releasable latch mechanism comprises a first key or gear sector member 42 that is affixed to the upper steering column section 10 by means of the pivot pin 35 that passes through an aperture or bore 43 as can best be seen by reference to FIGURES 3 and 6. This key or gear sector member 42 also has a pair of apertures 44 and 45 which will permit it to be non-rotatably affixed to the upper housing 13 by means of bolts, one of which passes through an aperture 46 in the upper housing member 13, which can be seen by reference to FIGURE 9. The key or gear sector member 42 includes a gear sector 48 that has a pitch circle disposed preferably in a vertical plane that passes through or closely adjacent to the center of the universal joint 27 and the center of the upper steering column section 10. This relationship can best be seen by reference to FIGURE 3.

Another key or gear sector member 51 is supported by the lower steering column section 12 through the housing 18 as can be most readily seen by an inspection of FIGURES 2 and 3. The lower housing 18 has an upwardly extending cylindrical support member 52 formed integrally therewith that extends over the universal joint 27. This cylindrical support member or portion 52 receives on its outer diameter a complementary formed cylindrical portion 53 of the key or gear sector member 51 so that the cylindrical portion 52 on the lower housing 18 rotatably supports the cylindrical portion 53 on the key or gear sector member 51 about the axis of the lower steering shaft section 21.

The key or gear sector member 51 also has a gear sector 54 that is complementary to the gear sector 48 formed on the first mentioned key or gear sector member 42 and is normally in engagement with it as shown in FIGURE 3. The pitch circle of the gear sector 54 is also positioned in a substantially vertical plane that passes through or closely adjacent to the center of the universal joint 27 and the center of the upper steering column section 10 when the gear sector 54 is in engagement with the gear section 48. The center of the pitch circle for the gear sector 48 on the key or gear sector member 42 and the center of the pitch circle of the gear sector 54 on the gear sector member or key 51 may coincide with the center of the universal joint 27 as can best be seen by reference to FIGURE 2. Although it is not essential that these centers coincide, these centers of the pitch circles should preferably lie on the axis defined by the pivot pins 34 and 35 so that the gear sector 48 will pivot about this axis. This relationship can be readily appreciated by an insepection of FIGURES 3, 4 and 5, in which it can be seen that the gear sector member or key 42 pivots about this axis as the upper steering column section 10 and the steering wheel 11 are pivotally adjusted about this axis.

The gear sector member or key 51 is spring urged by springs 57 that engage the lower housing 18 and the gear sector member or key 51 into a position where the gear sector 54 on this member engages the gear sector 48 on the gear sector member or key 42. This can best be seen by reference to FIGURES 1 and 3. The interengagement of the two gear sectors 48 and 54 releasably latches or locks the upper steering column section 10 and steering wheel 11 in any one of a number of operable driving positions that are determined by the number of teeth on the gear sector 54 of the gear sector member or key 51.

The gear sector member or key 51 has an axially extending tongue 58 that extends through a slot 61 in the lower housing 18. This axially extending tongue 58 may be engaged by a radially inwardly extending tab 62 on the transmission selector housing 23 when the transmission selector housing 23 and lever 24 are moved a few degrees beyond the normal park position. This interengagement can best be seen by reference to FIGURE 4. Thus, as the transmission selector housing 23 and lever 24 are moved a few degrees beyond the park position, the gear sector member 51 is rotated counterclockwise as viewed in FIGURE 4, or clockwise as viewed in FIGURES 1 and 5, against the bias of springs 57 thereby rotating the gear sector 54 out of engagement with the gear sector 48 on the gear sector member or key 42 that is attached to the upper housing 13. This action releases or disengages the multiple position releasable latch mechanism 41 to permit the adjustment of the upper steering column section 10 and steering wheel 11 about the substantially horizontal axis defined by the pivot pins 34 and 35.

It can readily be seen by an inspection of FIGURES 2 and 8, that the rotation of the transmission selector housing will actuate a linkage mechanism, generally designated by the numeral 64, in FIGURE 8, to select the various operating conditions for the transmission 65. This is done by the rotation of the transmission selector tube 66 that is attached to the transmission selector housing 23 by means of a bolt 67. The rotary motion of the transmission selector tube 66 is converted into linear motion at the transmission 65 through the lever arm 68 that is attached to the transmission selector tube 66, links 69 and 70, and links 71, 72 and 73. The links 70 and 71 are affixed to a shaft 75 that is rotatably supported by means of support brackets 77 and 78. This is a conventional automatic transmission selector mechanism and linkage, and it has sufficient resiliency to permit the transmission selector housing to be moved a few degrees beyond the park position. As the transmission selector housing is moved to this position from the park position shown in the transmission selector dial 81 in FIGURE 3, the linkage mechanism will elastically deform to an extent to prevent damage to its or the valve mechanisms contained in the transmission 65.

As an alternative, the linkage 64 may include a spring loaded connection which will have sufficient spring force to permit the selection of the various operating conditions of the transmission 65 as the transmission selector housing 23 is rotated through the various operating positions as indicated on the transmission selector dial 81, shown in FIGURE 3, and will wind up as the transmission selector valve in the transmission 65 bottoms out in the transmission housing. This modification is well within the skill of persons skilled in the art and further explanation thereof seems to be unnecessary.

Thus, as the transmission selector lever 24 and the housing 23 are moved a few degrees beyond the park position, the releasable latch mechanism 41 is released and the upper steering column section 10 and steering wheel 11 may be adjustably positioned into any one of a number of different operative driving positions by relative movement between the gear sector 48 on the gear section member or key 42 and the gear sector 54 on the gear sector member or key 51. When the transmission selector lever 24 is released, the transmission selector housing 23 is moved back to the park position through the action of the springs 57, the axially extending tongue 58 on the gear sector member or key 51 and the tab 62 on the transmission selector housing. At the same time, the gear sector 54 will come into engagement with gear sector 48 thereby locking the upper steering column section 10 and the steering wheel 11 in any selected operable driving position.

An additional hand-operated releasing lever for the multiple position releasable latch 41 is also provided to permit adjustment of the upper steering column section 10 and steering wheel 11 into any operative driving position when the transmission selector housing is positioned in any one of the transmission operating positions shown by the dial 81. This hand-operated lever mechanism is shown in FIGURES 1 through 3, and 5, and is generally designated by the numeral 82. It comprises an L-shaped member 83 that is rotatably supported in the lower housing 18, one arm of which extends outwardly from the lower housing 18 and has an enlarged end portion 84 that may be engaged by the vehicle operator. The other portion 85 is the portion that is rotatably supported in the lower housing 18 and it carries an operating finger 86 that is connected to the portion 85 through a spring 87. A nut 88 is employed to prevent the finger 86 from disengaging from the portion 85 of the lever 82. This finger 86 engages a radially and axially extending protrusion 91 on the gear sector member or key 51.

Rotation of the lever 82 in a counterclockwise direction, as viewed in FIGURES 1 and 2, will move the finger 86 through the spring 87 thereby rotating the gear sector member or key 51, so that the gear sector 54 is rotated out of engagement with the gear sector 48 on the gear sector member or key 42, against the bias of the springs 57. This action will, therefore, permit the vehicle operator to adjust the steering wheel 11 and upper steering column section 10 into any selected one of the number of operable driving positions. When the lever 84 is released, the springs 57 will rotate the gear sector member or key 51 in the direction to engage the gear sector 54 with the gear sector 48 on the gear sector member or key 42 thereby latching the upper steering column section 10 and steering wheel 11 into the selected driving position.

A spring 95, as shown in FIGURE 2, is positioned between and is coupled to the lower housing 18 and the upper housing 13 thereby biasing or urging the upper housing 13, the upper steering column section 10 and the steering wheel 11 into an uppermost position which will permit easy egress from and access to the driver's seat of the vehicle. Thus, as the vehicle operator moves the transmission selector housing 23 via the transmission selector lever 24 to the park position, as he would normally do when he leaves the vehicle, he may release the releasable latch 41 by continuing this movement a few degrees beyond the park position as previously explained. The spring 95 will then automatically move the upper steering column section 10 and the steering wheel 11 into this uppermost position. When he releases the transmission selector lever 24, the releasable latch mechanism 41 will engage to lock the steering wheel 11 and steering column section 10 in this uppermost driving position.

A memory device or means, generally designated by the numeral 97 and shown in FIGURES 2 and 3, may be set by the vehicle operator when the upper steering column section 10 and the steering wheel 11 are in an operative driving position. It will locate this previously selected operable driving position when the steering wheel is returned from the uppermost position previously described. In order to return the steering wheel 11 and upper steering column section 10 from this position, the operator of the vehicle must either move the transmission selector housing 23 and lever 24 beyond the park position or must operate the hand-operated lever 82 to release the releasable latching mechanism 41.

The memory device or means 97 comprises an L-shaped lever 98 having one arm 99 positioned at the bottom of the upper steering column section 10 and having the other arm 101 extending through a slot 102 in the lower housing 18. The slot 102 extends, as can best be seen in FIGURE 2, in an axial direction with respect to the lower steering shaft section 21. The slot 102 has a first enlarged portion 103 and a second enlarged portion 104. The first enlarged portion 103 receives an enlarged circular flange 105 on the arm 101 of the lever 98, while the second enlarged portion 104 receives a nut 106 that is threaded on the arm 101. The second enlarged portion 104 of the slot 102 is dimensioned so that it will prevent rotation of the nut 106 but will permit the nut to slide with the arm 101 in the slot 102.

With the lever 98 positioned as shown in FIGURES 2 and 3, the nut is tightened to prevent the sliding of the lever 98. However, when the lever 98 is turned to the left, as viewed in FIGURE 3 or toward the viewer as shown in FIGURE 2, the nut will loosen the clamping action between itself, the lower housing 18 and the enlarged circular flange 105 on the lever 98, to permit the lever 98 to slide axially in the slot 102. The arm 101 is adapted to engage an extending housing or flange portion 107 of the upper steering column section 10. Therefore, as the lever is moved axially to the left as shown in FIGURE 2, it wil permit the upper steering shaft section 10 and the steering wheel 11 to be positioned in a lower position.

Assuming, therefore, that the steering wheel 11 and the upper steering column section 10 are positioned in one of the operable driving positions, the driver will loosen the nut 106 and the lever 98 by turning it as previously described and then will slide the lever in the slot 102 into engagement with the extending housing or flange portion 107. Thereafter, the upper steering column section 10 and the steering wheel 11 may be moved to the uppermost position by the action of the transmission selector housing 23 and lever 24 moving the few degrees beyond the park position, as previously described. The lever 98 then locates the previously selected driving position as the upper steering column section 10 and the steering wheel 11 are returned toward the operable driving positions from this uppermost position.

The present invention thus provides an adjustable steering column and wheel for an automotive vehicle in which the steering wheel and upper steering column section may be removed to a remote position to facilitate easy egress from and access to the driver's seat of the vehicle through the use of the transmission selector lever and housing, preferably as these components are moved a few degrees beyond the park position. The movement of the transmission selector lever and housing into this position will also permit the adjustment of the steering wheel and upper steering column into any one of a number of different operable driving positions. The invention also provides an auxiliary adjusting lever which will permit adjustment of the steering wheel and upper steering column section into any one of a number of different driving positions irrespective of the position of the transmission selector lever and housing. Additionally, a memory device is employed which will locate the steering wheel and upper steering column section in a previously selected driving position as these components are returned from a remote poistion that facilitates easy egress from and access to the vehicle driver's seat.

It is to be understood that this invention is not to be limited to the exact construction shown and described, but that various changes and modifications may be made without departing from the spirit and scope of the invention as defined in the appended claims.

What is claimed is:

1. A tiltable steering column mechanism for an automotive vehicle comprising, an upper steering shaft section, an upper housing rotatably mounting said upper steering shaft section, a steering wheel affixed to said upper steering shaft section, a lower steering shaft section, a fixed lower housing rotatably mounting said lower steering shaft section, a universal joint coupling, said upper steering shaft section and said lower steering shaft section, pivot means pivotally mounting said upper housing on said fixed lower housing on a substantially horizontal axis disposed substantially transversely with respect to the axis of said lower steering shaft section, releasable latch means releasably latching said upper housing, said upper steering shaft section and said steering wheel in any one of a number of operable driving positions, a transmission selector housing rotatably mounted on said fixed lower housing, a transmission selector lever mounted in said transmission selector housing, a linkage means coupled to said transmission selector housing and adapted to be coupled to the transmission of the vehicle, said transmission selector housing being rotatable into a plurality of different positions to select different operating conditions for the transmission including an operable driving condition and a "Park" condition, and cooperating means on said releasable latch means and said transmission selector housing for releasing said releasable latch means when said transmission selector housing is rotated beyond the "Park" position in the direction of movement from the operable driving condition to the "Park" condition.

2. The combination of claim 1 in which said releasable latching means comprises, a gear sector rigidly attached to said upper housing, a gear sector rotatably mounted on said lower housing about the axis of said lower steering shaft section, spring means engaging said second mentioned gear sector and said lower housing for urging said gear sectors into engagement, and said cooperating means on said releasable latch means and said transmission selector housing comprising a tongue on said second gear sector extending into the path of travel of a portion of said transmission selector housing as said transmission selector housing is rotated beyond the "Park" position.

3. The combination of claim 2 in which a hand operated means is rotatably mounted in said lower housing, said hand operating means including means operatively engaging said second mentioned gear sector for rotating said second mentioned gear sector out of engagement with said first mentioned sector gear when said hand operated means is operated.

4. The combination of claim 3 in which a spring means couples said upper housing and said lower housing for moving said upper housing, said upper steering shaft section and said steering wheel to an uppermost driving position when said releasable latch means is released and in which a releasable memory means is slidably mounted in said lower housing for slidable movement in a direction generally parallel to the axis of said lower steering shaft section and into engagement with said upper housing when said upper housing is positioned in any of said operative driving positions whereby said releasable memory means will locate said upper housing, said upper steering shaft section and said steering wheel in a driving position previously selected when said upper housing, said steering shaft section and said steering wheel are returned toward the lower operable driving positions from said uppermost driving position.

5. A tiltable steering column mechanism for an automotive vehicle comprising, a movable upper steering column section including a steering wheel, a fixed lower steering column section, means pivotally mounting said movable upper steering column section on said fixed lower column section for tiltable movement about an axis, releasable latching means coupling said movable upper steering column section and said fixed lower steering column section, a transmission selector means carried by said fixed lower steering column section and adapted to be coupled to a transmission, and cooperating means carried by said transmission selector means and said releasable latching means for releasing said releasable latching means when said transmission selector means is moved beyond a "Park" position in a direction of movement from a driving position toward the "Park" position.

6. The combination of claim 5 in which a hand operated means is mounted in one of said steering column sections and is coupled to said releasable latching means for releasing said releasable latching means when operated irrespective of the position of said transmission selector means.

7. The combination of claim 5 in which a spring means is coupled to said fixed lower steering column section and said movable upper steering column section for moving said movable upper steering column section into its uppermost position in the vehicle when said releasable latching means is released, and a movable memory means is slidably positioned in said fixed lower steering column section for engagement with said movable upper steering column section as said movable upper steering column section is returned from the uppermost position in the vehicle.

8. The combination of claim 5 in which a hand-operated means is mounted in one of said steering column sections and is coupled to said releasable latching means for releasing said releasable latching means when operated irrespective of the position of said transmission selector means, spring means is coupled to said fixed lower column section and said movable upper column section for moving said movable upper steering column section into its uppermost position in the vehicle when said releasable latching means is released, and a movable memory means is slidably positioned in said fixed lower steering column section for engagement with said movable upper steering column section as said movable steering column section is returned from the uppermost position in the vehicle to a previously selected driving position.

9. A tiltable steering column mechanism for an automotive vehicle comprising, a movable upper steering column section including a steering wheel, a fixed lower steering column section, means pivotally mounting said movable upper steering column section on said fixed lower steering column section for tiltable movement about an axis, releasable latching means coupling said movable upper steering column section and said fixed lower steering column section, a transmission selector means carried by said fixed lower steering column section, linkage means coupling said transmission selector means and said transmission for shifting said transmission into a number of operative driving positions, and cooperating means carried by said transmission selector means and said releasable latching means for releasing said releasable latching means when said transmission selector means is moved to a position other than said operative driving positions.

10. The combination of claim 9 in which said releasable latch means comprises, a first latch member fixed to one of said sections, a second latch member rotatably mounted on the other of said sections, said transmission selector means is rotatably mounted on said fixed lower steering column section, and said cooperating means carried by said transmission selector means and said releasable latching means is operable for releasing said releasable latching means when said transmission selector means is rotated beyond the "Park" position in a direction of movement from an operative driving position toward the "Park" position.

References Cited

UNITED STATES PATENTS 3,302,478  2/1967  Pauwels _____ 74—493

MILTON KAUFMAN, *Primary Examiner.*